W. C. KLEIN.
VEHICLE DRIVE.
APPLICATION FILED JAN. 26, 1921.
1,393,543.
Patented Oct. 11, 1921.
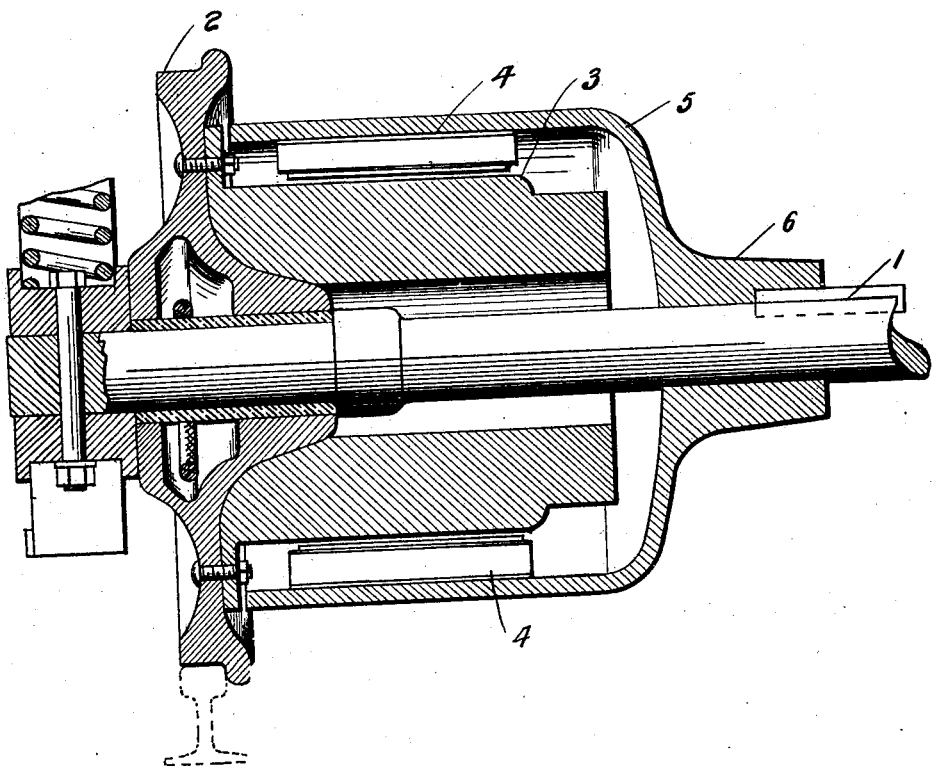
Inventor
W. C. Klein.

UNITED STATES PATENT OFFICE.

WILLIAM C. KLEIN, OF ALLENTOWN, PENNSYLVANIA.

VEHICLE-DRIVE.

1,393,543.

Specification of Letters Patent.

Patented Oct. 11, 1921.

Application filed January 26, 1921. Serial No. 440,164.

*To all whom it may concern:*

Be it known that I, WILLIAM C. KLEIN, a citizen of the United States, residing at Allentown, in the county of Lehigh and State of Pennsylvania, have invented certain new and useful Improvements in Vehicle-Drives; and I do hereby declare the following to be a full, clear, and exact description of the invention, such as will enable others skilled in the art to which it appertains to make and use the same.

The invention relates to electrically driven vehicles and aims to simplify the construction and arrangement of the driving mchanism and reduce the same to the fewest number of parts possible by dispensing with transmission and differential, the axles being non-rotating and the wheels loose thereon and adapted to have the driving force applied directly thereto.

In accordance with the invention, the drive wheel has an electric motor associated therewith, the armature being connected directly with the wheel and the field or pole pieces being fast to the axle which is made secure against rotation, thus it is feasible to apply the pulling force directly to the wheels and to dispense with the usual transmission gears and differential. As a result considerable weight is obviated and the driving mechanism materially simplified and reduced to a minimum cost.

For a full understanding of the invention and the merits thereof reference is to be had to the following description and the drawing hereto attached, which is a sectional view of the wheel and electric motor associated therewith illustrating an embodiment of the invention.

While the invention is illustrated in connection with a car wheel, it is to be understood that it is adapted for use in driving a vehicle wheel of any nature. The usual axle 1 is mounted so as to be non-rotating. The wheel 2 is loose upon the axle and is adapted to have the driving force applied directly thereto.

An electric motor is associated with the wheel 2 in any manner to admit of the driving force being applied directly thereto. The motor may be of any make and design and comprises an armature 3 and a field or pole pieces 4. The armature 3 is fast with the wheel 2 so as to rotate therewith. The field or pole pieces 4 is fixed and preferably mounted upon the axle 1. A shell or casing 5 houses the motor and is secured to the axle 1. The outer end of the shell 5 is open and approaches close to the inner side of the wheel 2. The inner end of the shell 5 is closed and formed with a boss or hub 6 which snugly receives the axle 1 to which it is secured in any manner. It will be understood that the wheel and axle form supporting means for the component parts of the motor, hence said parts are maintained in axial alinement at all times.

The invention admits of the driving power being applied directly to the wheel and as a result each of the wheels may be positively driven thereby obviating the use of transmission gearing and differential. The construction is extremely simple and embodies a few number of parts.

What is claimed is:

A vehicle drive comprising a shaft, a wheel journaled thereon, a shell having a hub secured to said shaft at a distance from said wheel, said shell intermediate the hub and wheel being relatively large and open adjacent the wheel and terminating relatively close to the wheel, armature means and field means within said shell, one of said means being secured to the wheel and the other of said means being secured to said shell.

In testimony whereof I affix my signature in presence of two witnesses.

WILLIAM C. KLEIN.

Witnesses:
 THOMAS V. LONG,
 WILLIAM J. TRYTHALL.